(12) United States Patent
Webster et al.

(10) Patent No.: US 8,620,115 B2
(45) Date of Patent: Dec. 31, 2013

(54) OPTICAL MODULATORS WITH CONTROLLABLE CHIRP

(75) Inventors: Mark Webster, Bethlehem, PA (US); Kalpendu Shastri, Orefield, PA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 13/032,899

(22) Filed: Feb. 23, 2011

(65) Prior Publication Data

US 2011/0222813 A1 Sep. 15, 2011

Related U.S. Application Data

(60) Provisional application No. 61/312,285, filed on Mar. 10, 2010.

(51) Int. Cl.
*G02F 1/035* (2006.01)
*G02B 6/26* (2006.01)
*G02B 6/42* (2006.01)

(52) U.S. Cl.
USPC ............ 385/3; 385/1; 385/2; 385/39; 385/40; 385/45

(58) Field of Classification Search
USPC ....................................................... 385/3, 45
See application file for complete search history.

(56) References Cited

U.S. PATENT DOCUMENTS

| | | | |
|---|---|---|---|
| 7,272,271 B2 | 9/2007 | Kaplan et al. | |
| 7,515,778 B2 | 4/2009 | Mosinskis et al. | |
| 2002/0131665 A1 | 9/2002 | Sriram et al. | |
| 2003/0147577 A1 | 8/2003 | Kataoka et al. | |
| 2005/0189591 A1 | 9/2005 | Gothoskar et al. | |
| 2005/0254743 A1 | 11/2005 | Akiyama et al. | |
| 2008/0089634 A1* | 4/2008 | Mosinskis et al. | 385/3 |
| 2008/0095486 A1* | 4/2008 | Shastri et al. | 385/3 |
| 2008/0219614 A1 | 9/2008 | Gill et al. | |

FOREIGN PATENT DOCUMENTS

JP 11-052314 2/1999

* cited by examiner

*Primary Examiner* — Ryan Lepisto
(74) *Attorney, Agent, or Firm* — Patterson & Sheridan, LLP (57) ABSTRACT

A semiconductor-based optical modulator is presented that includes a separate phase control section to adjust the amount of chirp present in the modulated output signal. At least one section is added to the modulator configuration and driven to create a pure "phase" signal that will is added to the output signal and modify the $e^{i\Phi}$ term inherent in the modulation function. The phase modulation control section may be located within the modulator itself, or may be disposed "outside" of the modulator on either the input waveguiding section or the output waveguiding section. The phase control section may be formed to comprise multiple segments (of different lengths), with the overall phase added to the propagating signal controlled by selecting the different segments to be energized to impart a phase delay to a signal propagating through the energized section(s).

10 Claims, 6 Drawing Sheets

OPTICAL MODULATORS WITH CONTROLLABLE CHIRP

CROSS-REFERENCE TO RELATED APPLICATIONS

This application claims the benefit of U.S. Provisional Application No. 61/312,285, filed Mar. 10, 2010 and herein incorporated by reference.

TECHNICAL FIELD

The present invention relates to optical modulators and, more particularly, to semiconductor-based optical modulators including a separate phase control segment to adjust the amount of chirp present in the modulated output signal.

BACKGROUND OF THE INVENTION

For many years, optical modulators have been made out of electro-optic material, such as lithium niobate. Optical waveguides are formed within the electro-optic material, with metal contact regions disposed on the surface of each waveguide arm. A continuous wave (CW) optical signal is launched into the waveguide, and an electrical data signal input is applied as an input to the metal contact regions. The applied electrical signal modifies the refractive index of the waveguide region underneath the contact, thus changing the speed of propagation along the waveguide. By applying the voltage(s) that produce a 7C phase shift between the two arms, a nonlinear (digital) Mach-Zehnder modulator is formed.

Although this type of external modulator has proven extremely useful, there is an increasing desire to form various optical components, subsystems and systems out of semiconductor material systems (e.g., InP, GaAs, silicon, or the like), with silicon-based platforms being generally preferred. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Moreover, it is well-known that lithium niobate-based devices have inherent performance limitations at data rates exceeding, for example, 1 GB/s, since they need to be modeled as traveling wave structures, with relatively complex electrical drive structures required to attempt to have the device operate at the requisite speed.

Figure 1:
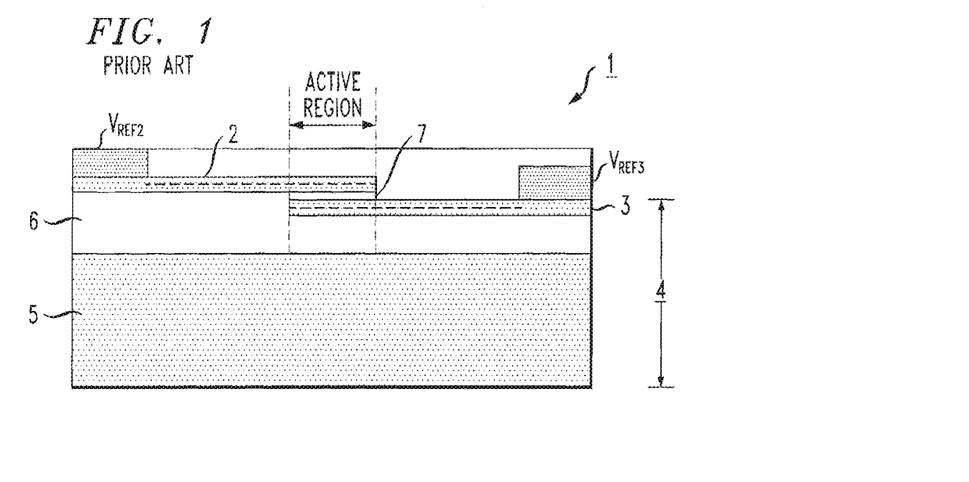
FIG. 1 is a diagram of a prior art silicon-based optical modulator.

A significant advance has been made in the ability to provide optical modulation in a silicon-based platform, as disclosed in U.S. Pat. No. 6,845,198 issued to R. K. Montgomery et al. on Jan. 18, 2005, assigned to the assignee of this application and incorporated herein by reference. FIG. 1 illustrates one exemplary arrangement of a silicon-based modulator device as disclosed in the Montgomery et al. patent. In this case, a silicon-based optical modulator 1 comprises a doped silicon layer 2 (typically, polysilicon) disposed in an overlapped arrangement with an oppositely-doped portion of a sub-micron thick silicon surface layer 3 (often referred to in the art as an SOI layer). SOI layer 3 is shown as the surface layer of a conventional silicon-on-insulator (SOI) structure 4, which further includes a silicon substrate 5 and a buried oxide layer 6. Importantly, a relatively thin dielectric layer 7 (such as, for example, silicon dioxide, silicon nitride, potassium oxide, bismuth oxide, hafnium oxide, or other high-dielectric-constant electrical insulating material) is disposed along the overlapped region between SOI layer 3 and doped polysilicon layer 2. The overlapped area defined by polysilicon layer 2, dielectric 7 and SOI layer 3 defines the "active region" of optical modulator 1. In one embodiment, polysilicon layer 2 may be p-doped and SOI layer 3 may be n-doped; the complementary doping arrangement (i.e., n-doped polysilicon layer 2 and p-doped SOI layer 3) may also be utilized.

Figure 2:
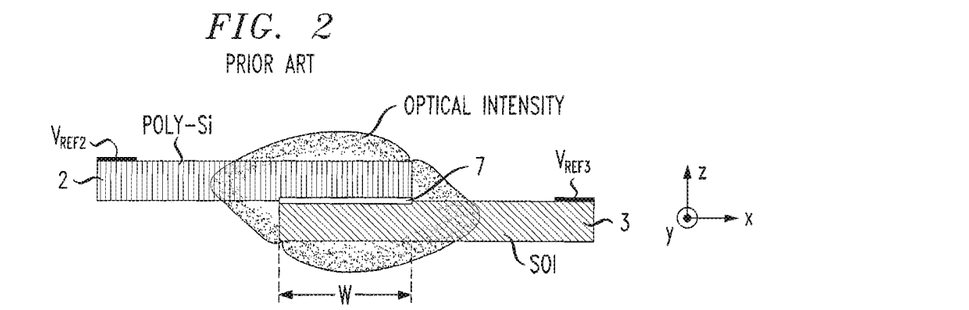
FIG. 2 is an enlarged view of the active region of the prior art optical modulator of FIG. 1.

FIG. 2 is an enlarged view of the active region of modulator 1, illustrating the optical intensity associated with a signal propagating through the structure (in a direction perpendicular to the paper) and also illustrating the width W of the overlap between polysilicon layer 2 and SOI layer 3. In operation, free carriers will accumulate and deplete on either side of dielectric layer 7 as a function of the voltages (i.e., the electrical data input signals) applied to doped polysilicon layer 2 ($V_{REF2}$) and SOI layer 3 ($V_{REF3}$). The modulation of the free carrier concentration results in changing the effective refractive index in the active region, thus introducing phase modulation of an optical signal propagating along a waveguide defined by the active region. In the diagram of FIG. 2, the optical signal will propagate along the y-axis, in the direction perpendicular to the paper.

Figure 3:
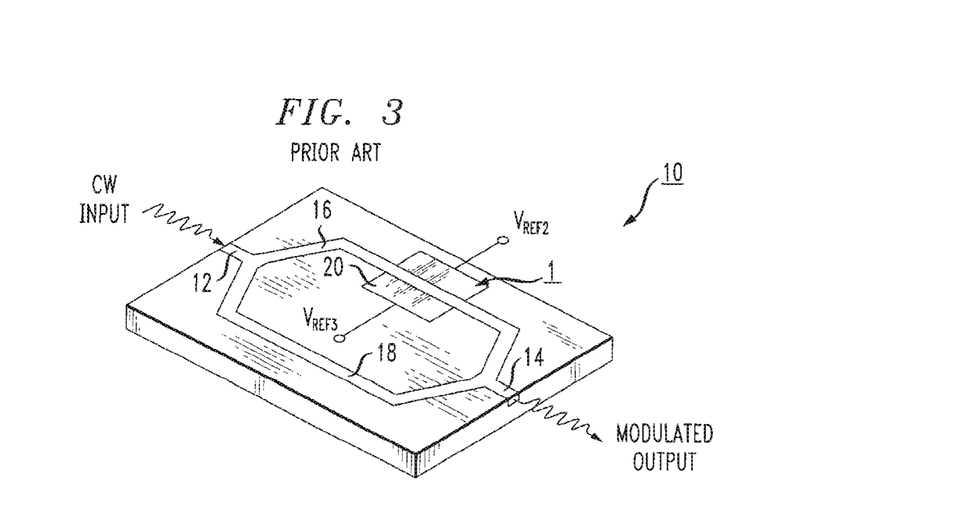
FIG. 3 is a prior art Mach-Zehnder interferometer (MZI) utilizing the silicon-based optical modulator of FIG. 1.

FIG. 3 illustrates an exemplary prior art silicon-based Mach-Zehnder interferometer (MZI) 10 that is configured to utilize silicon-based modulating devices 1 as described above. As shown, prior art MZI 10 comprises an input waveguide section 12 and an output waveguide section 14. A pair of waveguiding modulator arms 16 and 18 are shown, where in this example waveguide arm 16 is formed to include a modulating device 1 as described above.

In operation, an incoming continuous wave (CW) light signal from a laser source (not shown) is coupled into input waveguide section 12. The CW signal is thereafter split to propagate along waveguide arms 16 and 18. The application of an electrical drive signal to modulator 1 along arm 16 will provide the desired phase shift to modulate the optical signal, forming a modulated optical output signal along output waveguide 14. A pair of electrodes 20 are illustrated in association with modulator 1 and used to provide the electrical drive signals ($V_{REF2}$, $V_{REF3}$). A similar modulating device may be disposed along waveguiding arm 18 to likewise introduce a phase delay onto the propagating optical signal. When operating in the digital domain, the electrodes may be turned "on" when desiring to transmit a logical "1" and then turned "off" to transmit a logical "0".

Figure 4:
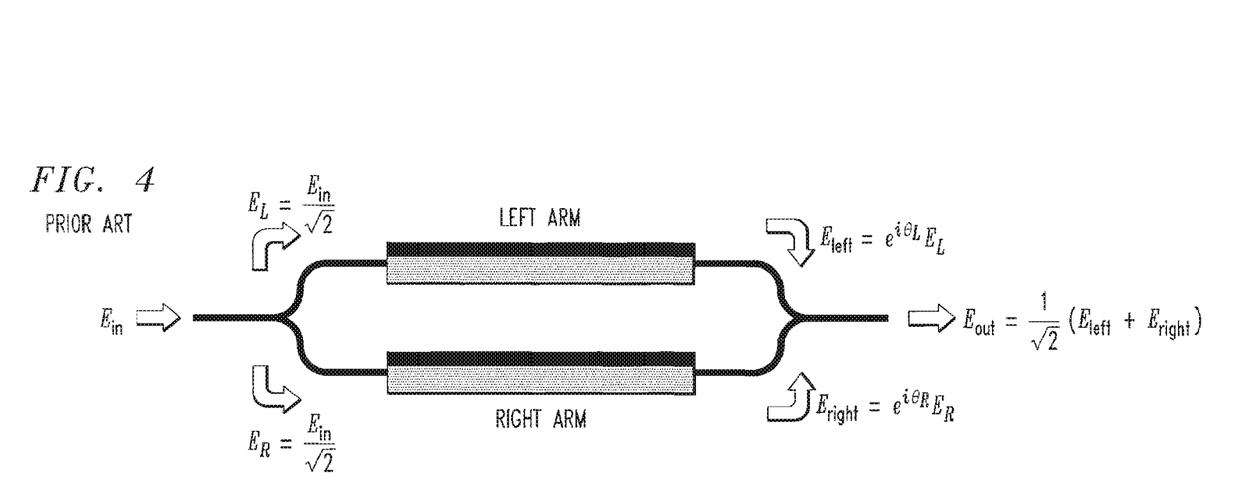
FIG. 4 is a diagram of the MZI of FIG. 3, showing the values of the electric fields at various locations along the optical signal path of the MZI.

FIG. 4 is a diagrammatic illustration of modulator 10, illustrating the various electric field components associated with the prior art modulator, defining the chirp parameter which is the specific subject matter of concern in the present invention. Referring to FIG. 4, the incoming CW optical signal is defined by the electrical field $E_{in}$. Presuming a 50:50 power split into waveguide arms 16, 18, each waveguide will see an electric field of $E_{in}/\sqrt{2}$ (also shown as $E_L$ and $E_R$) at their respective inputs. Each propagating signal will modulated along its respective arm, in the manner described above, and the electric fields of the output signals exiting waveguide arms 16, 18 are expressed as follows:

$$E_{left}=e^{i\theta_L}E_L, \text{ and}$$

$$E_{right}=e^{i\theta_R}E_R.$$

Combining these two signals along output waveguide 14 yields the following value for the output electrical field $E_{out}$:

$$E_{out} = \frac{1}{\sqrt{2}}(E_{left} + E_{right})$$
$$= E_{in}\cos(\Delta\phi)e^{i\phi},$$

where $\Delta\phi=(\theta_R-\theta_L)/2$ and $\phi=(\theta_R+\theta_L)/2$. The $\cos(\Delta\phi)$ term is associated with the amplitude modulation imparted onto the propagating optical signal by virtue of the applied electrical input signal The $e^{i\phi}$ term is a "pure" phase term, representative of the overall phase remaining in the output signal when compared to the input signal.

Figure 5:
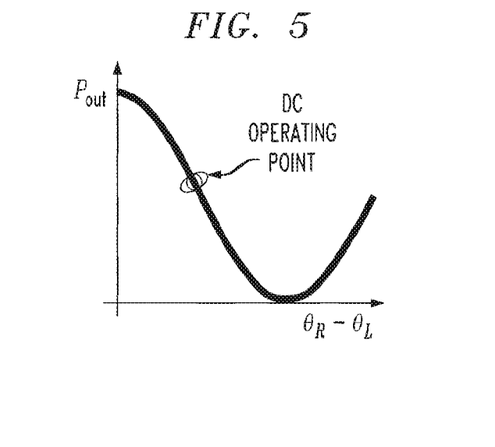
FIG. 5 is a graph of the transfer curve of the MZI of FIG. 3.

To the first order, the output power $P_{out}$ of a conventional modulator as shown above is given by the equation:

$$P_{out}=|E_{out}|^2=\tfrac{1}{2}|E_{in}|^2[1+\cos(\theta_R-\theta_L)]$$

where the optical output power level is controlled by changing the value of the net phase difference $\Delta\phi$ between the two arms. FIG. 5 is a plot of this relationship, illustrating the output power as a function of phase shift between the two arms (a "1" output associated with maximum output power $P_{out}$ and a "0" output associated with minimum output power $P_{out}$). That is, a differential phase shift between the two arms of the modulator provides either constructive interference (e.g., "1") or destructive interference (e.g., "0"). As will be described below, a modulator may also include a DC section to optically balance the arms and set the operating point at a desired location along the transfer curve shown in FIG. 5.

While considered a significant advance in the state of the art over lithium niobate modulators, silicon-based optical modulators in general and the exemplary configuration of FIG. 3 in particular are known to suffer from chirp as a result of the inherent phase response and optical loss differences between the two arms of the modulator. Chirp is a time-varying optical phase that can be detrimental to the transmission behavior of an optical signal as it propagates through dispersive fiber. The chirp behavior of optical modulators is often characterized using an "alpha parameter" that is defined as the amount of phase modulation normalized to the amount of amplitude (intensity) modulation produced by the modulator. The alpha ($\alpha$) parameter may be defined as follows:

$$\alpha = 2\frac{\frac{d\phi}{dt}}{\frac{1}{P}\frac{dP}{dt}}$$
$$= -\frac{1}{\tan(\Delta\phi)}\left(\frac{\frac{d\theta_R}{dt}+\frac{d\theta_L}{dt}}{\frac{d\theta_R}{dt}-\frac{d\theta_L}{dt}}\right),$$

and may exhibit a value that is zero, positive or negative, where for "zero" chirp, it is required that $d\theta_R/dt=-d\theta_L/dt$. In some applications, however, it is desirable to have a small amount of negative chirp (i.e., a small negative alpha parameter) to extend the transmission distance of a signal along a dispersive medium, such as an optical fiber, before dispersion limits the range. Even if "desirable", there is still a need to control (or "know") the amount of chirp that is associated with a particular modulator.

Figure 6:
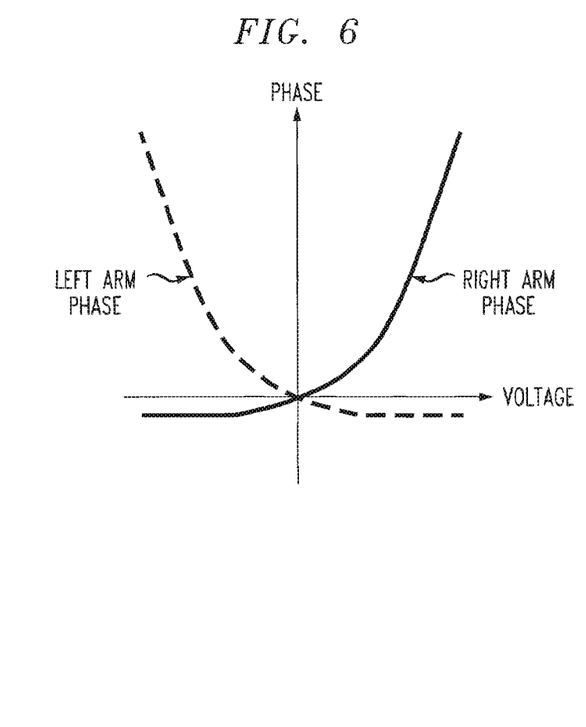
FIG. 6 is a plot of voltage vs. phase for the MZI of FIG. 3.

Conventional silicon-based optical modulators are known to exhibit non-zero chirp (even when configured in a symmetric drive arrangement) as a result of the nonlinear phase versus "applied voltage" response of their structure, as shown in FIG. 6. Increasing either the modulation speed or the distance traveled by the modulated optical signal has been found to only exacerbate the chirp problem, since the dispersion characteristics of the transmission fiber will have an even greater impact.

Thus, a remaining need in the design of silicon-based optical modulators is a way of controlling the chirp that is created during the modulation process and, indeed, creating a "desired" value of chirp for a specific application/system configuration.

SUMMARY OF THE INVENTION

The needs remaining in the art are addressed by the present invention, which relates to semiconductor-based optical modulators including a separate phase control section to adjust the amount of chirp present in the modulated output signal.

In accordance with the present invention, at least one section is added to the modulator configuration and driven to create a pure "phase" signal that will be added to the output signal and modify the $e^{i\phi}$ term inherent in the modulation function.

The phase modulation control section may be located within the modulator itself (with one segment on each arm, driven by the same input signal), or may be disposed "outside" of the modulator on either the input waveguiding section or the output waveguiding section. The placement of the phase modulation control section on the "outside" of the modulator having the advantage of creating a smaller capacitive load for the driver circuitry. The length of the phase modulation control section (in conjunction with the drive voltage applied to provide the modulation) then defines the amount of optical phase introduced to the propagating signal. It is important that when located inside the modulator, the segments are driven by the same polarity signal so that both segments impart the same phase delay to the signals propagating along each arm without creating a net phase difference between the two modulated signals as they are re-combined at the output of the modulator.

In one embodiment of the invention, the phase modulation control section is driven by the same signal that is used as the RF data input to the modulator itself, and provides a "fixed" phase adjustment to the output signal.

In an alternative embodiment, the phase modulation control section is driven by a separately controllable signal that allows for the phase to be adjusted for a specific application.

In yet another embodiment of the present invention, the phase modulation control section may be formed as a multi-segment arrangement, with separate ones of the segments being driven to control the amount of phase adjustment provided to the output signal.

Various ones of these embodiments may be used together and also used with other arrangements for controlling chirp in a modulator, such as controlling the voltages applied to the polysilicon layer of the modulator, as disclosed in our co-pending application Ser. No. 12/781,471, filed May 17, 2010.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 7:
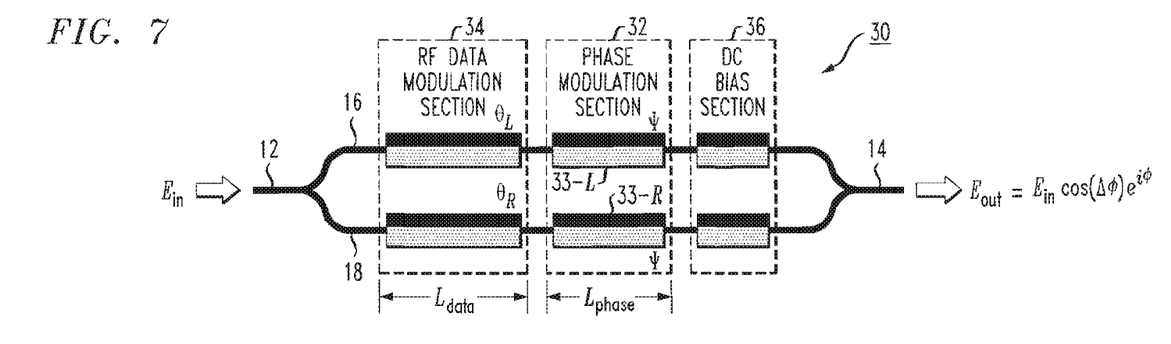
FIG. 7 illustrates an exemplary chirp controlled optical modulator formed in accordance with the present invention to include a phase modulation control section.

FIG. 7 illustrates an exemplary chirp controlled optical modulator 30 formed in accordance with the present invention. For the purposes of discussion, the components of modulator 30 that are similar to components of prior art modulator 10 carry the same reference numerals and their functionality is not discussed in detail. In this particular embodiment of the present invention, a phase modulation control section 32 is included in modulator 30 and is located "inside" the modulator with RF data modulation section 34 (which functions in the manner of the prior art as described above to impress an electrical modulating input signal on a CW optical signal propagating through the structure). In the embodiment of FIG. 7, a separate DC bias section 36 is also shown. The use of DC bias in a modulator is well-known in the art, and is used to ensure that the modulator provides the desired phase shift around a specific operating point. The DC operating point is shown on FIG. 5 as preferably located mid-way between the maximum and minimum values of the output power.

In accordance with the present invention, each portion 33-L and 33-R of phase modulation control section 32 is driven by the same signal (as opposed to the use of complementary signals used to drive the RF data modulation section), so that each arm "sees" the same overall phase adjustment, noted as $\psi$ in FIG. 7, where as a result of the addition of this phase adjustment section, $\phi$ is now defined as follows:

$$\phi = \psi + \frac{(\theta_R + \theta_L)}{2}$$

Thus, by controlling the value of $\psi$, the chirp of the overall modulator can be controlled. In particular, the length $L_{phase}$ of phase adjustment section 32 is optimized to provide the desired value of $\psi$ and, as a result the desired chirp value. Moreover, the same data input signal used to drive RF data modulation section 34 can be used to drive phase adjustment section 32.

Figure 8:
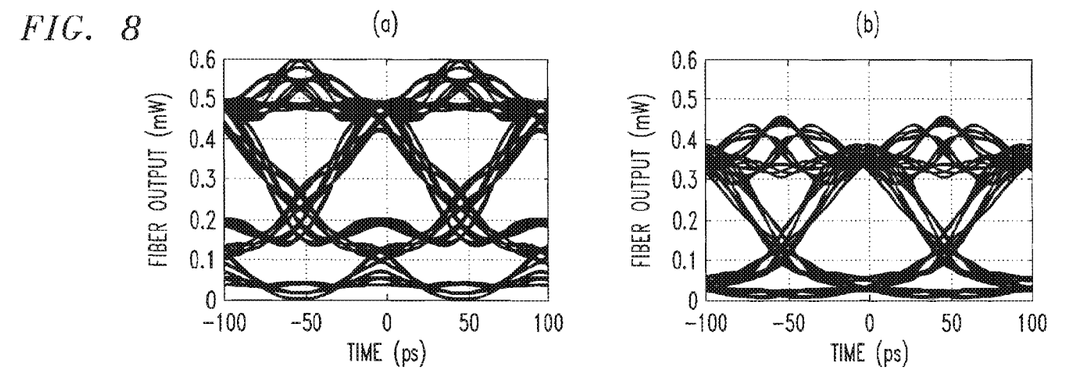
FIG. 8 contains relevant eye diagrams for an exemplary modulator operating at 10 Gb/s, with the eye diagram of FIG. 8(a) associated with a prior art silicon-based MZI and the eye diagram of FIG. 8(b) associated with the chirp controlled optical modulator of FIG. 7.

FIG. 8 contains a pair of "eye diagram" plots (i.e., signal output as a function of time) for a data rate of 10 Gb/s, showing the improvement in performance by virtue of adding a phase adjustment section to a silicon-based optical modulator. FIG. 8(a) is the eye diagram associated with a prior art silicon-based modulator, such as modulator of FIG. 3, measured for a modulator length $L_{data}$ of 350 µm. FIG. 8(b) is a plot of a modulator formed in accordance with the present invention, adding a phase adjustment section of $L_{phase}$=250 µm. The improvement in eye opening from controlling chirp is noticeable in the eye diagram of FIG. 8(b), especially at/near the low output power, "logic 0" value.

Figure 9:
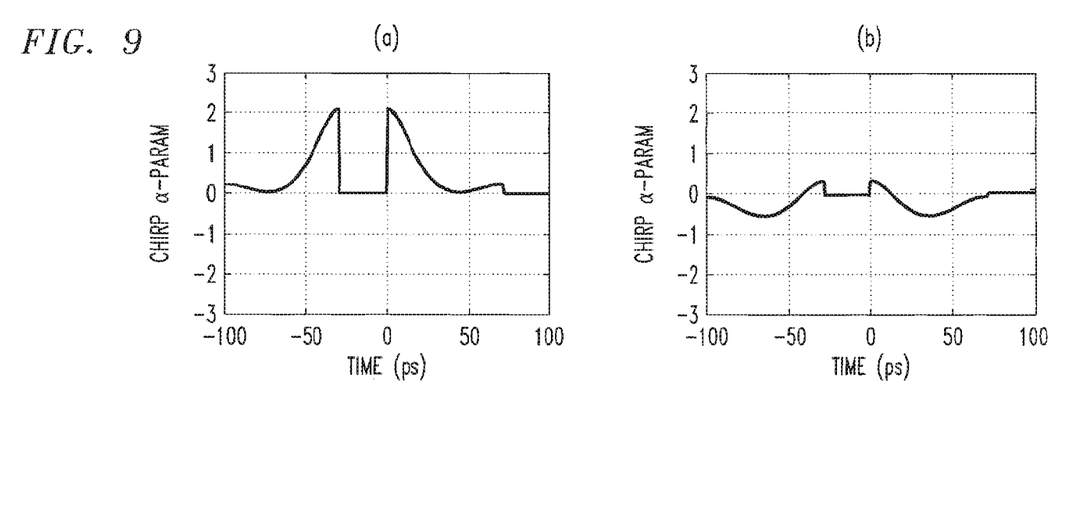
FIG. 9 contains plots of chirp associated with the prior art modulator (FIG. 9(a)) and the chirp controlled optical modulator of FIG. 7 (shown in FIG. 9(b))

FIG. 9 contains plots of the chirp parameters associated with the eye diagrams of FIGS. 8(a) and (b), where the chirp of the prior art shown in FIG. 9(a) is positive in value for an extended portion of the bit period and never goes below "zero chirp. In contrast, FIG. 9(b) illustrates the chirp associated with a modulator of the present invention, showing a substantial reduction in chirp (and, at times, a negative chirp value) within the bit period.

Figure 10:
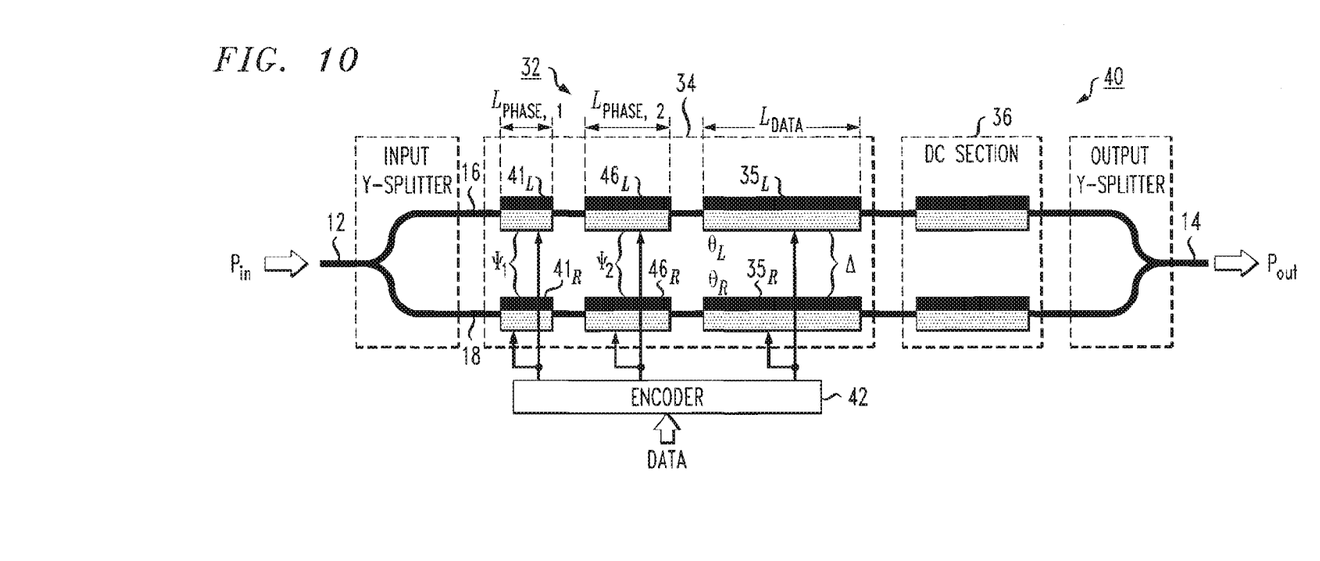
FIG. 10 illustrates a chirp controlled optical modulator of the present invention, utilizing a segmented phase modulation control section.

Various types of "segmented" optical modulators have been previously proposed. For example, U.S. Pat. No. 7,515,778, issued Apr. 7, 2009 and assigned to the assignee of this application, discloses a segmented modulator where the RF section comprises a plurality of segments to accommodate a multi-level input signal. This "segmented" approach may be used in accordance with the present invention to provide a tunable chirp control through a tunable phase modulation control section. FIG. 10 illustrates an exemplary optical modulator 40 formed in accordance with this aspect of the present invention, in this case showing the use of a single input data encoder 42 to provide inputs to both RF data modulation section 34 and phase adjustment section 32. The ordering of components along the arms of the interferometer is not important; in this embodiment, phase adjustment section 32 is positioned before RF data modulation section 34. As with the arrangement of FIG. 7, a complementary signal pair is used to differentially drive segments 35-L and 35-R of RF data modulation section 34.

In this particular arrangement as shown in FIG. 10, phase modulation control section 32 comprises two separate segments along each arm, denoted as segments 44-L and 46-L along waveguide arm 16, and segments 44-R and 46-R along waveguide arm 18. Segments 44-L and 44-R are shown as having a first length $L_{phase,1}$ and therefore impart a first phase delay $\psi_1$ to the propagating optical signal. Segments 46-L and 46-R are shown as having a second length $L_{phase,2}$, imparting a second phase delay $\psi_2$ to the propagating optical signal. In accordance with the present invention, therefore, by controlling the activation of these segments (via the input signals from encoder 42), the additional phase delay added to the output signal can be selected from the three different values: $\psi_1$, $\psi_2$, or $\psi_1+\psi_2$. Obviously, the inclusion of additional segments allows for further control of the applied phase delay.

Figure 11:
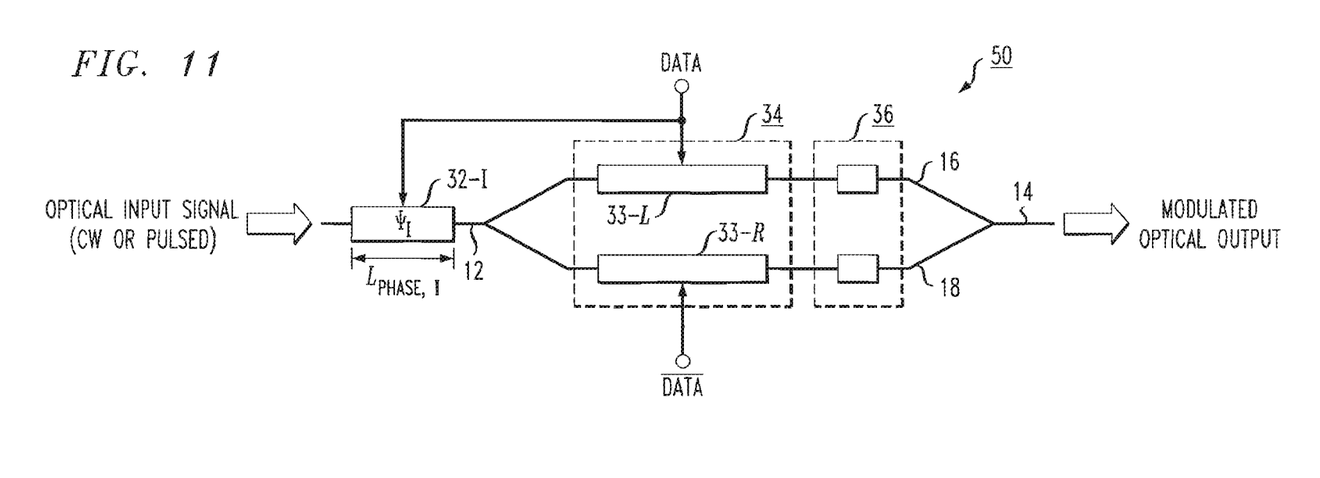
FIG. 11 illustrates an alternative chirp controlled optical modulator, where the phase modulation control section is disposed along the input waveguiding section of the modulator.

As mentioned above, it is also possible to locate the phase modulation control section of the inventive modulator "outside" of the modulation element itself, along either one of the input and output waveguide sections. FIG. 11 is a simplified diagram of an optical modulator 50 formed in accordance with this embodiment of the present invention. In this case, a phase modulation control section 32-I is positioned along input waveguide section 12 and is controlled by the same RF data input signal that drives arm 33-L of RF data modulation section 34. Phase modulation control section 32-I is shown has having a length $L_{phase,1}$ for imparting a phase of $\psi_1$ onto the incoming signal propagating along waveguide section 12 (before it is split along waveguide arms 16, 18). The use of only a single segment to provide the phase adjustment to the propagating signal introduces less of a capacitive load than the embodiments described above with the phase modulation control section located inside of the modulator and requiring a pair of segments to introduce the phase adjustment along each waveguide arm.

Figure 12:
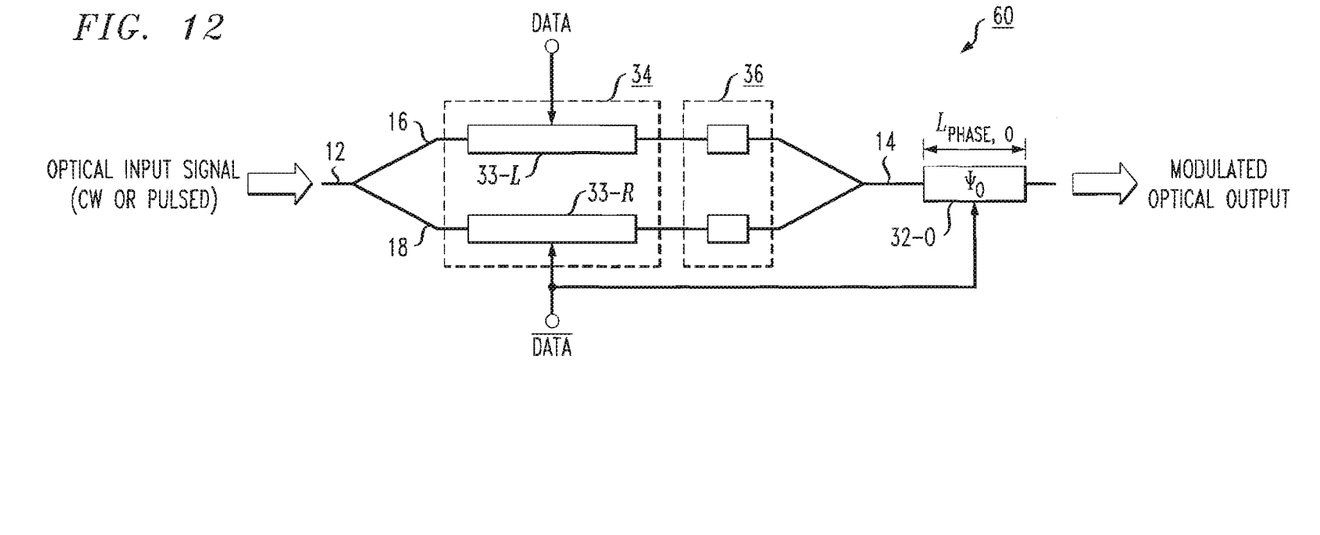
FIG. 12 illustrates yet another alternative chirp controlled optical modulator, where the phase modulation control section is disposed along the output waveguiding section of the modulator.

FIG. 12 illustrates a similar embodiment as shown in FIG. 11, in this case illustrating an optical modulator 60 with a phase modulation control section 32-O disposed along output waveguide section 14 and controlled by the inverted RF data signal used to control segment 35-R of RF data modulation section 34. As shown, phase modulation control section 32-O has a length of $L_{phase,O}$ selected to introduce a phase delay $\psi_O$ into the optical output signal. Again, the use of a single segment to provide the phase adjustment introduces less capacitance into the modulator than the embodiments requiring the use of a pair of segments.

Figure 13:
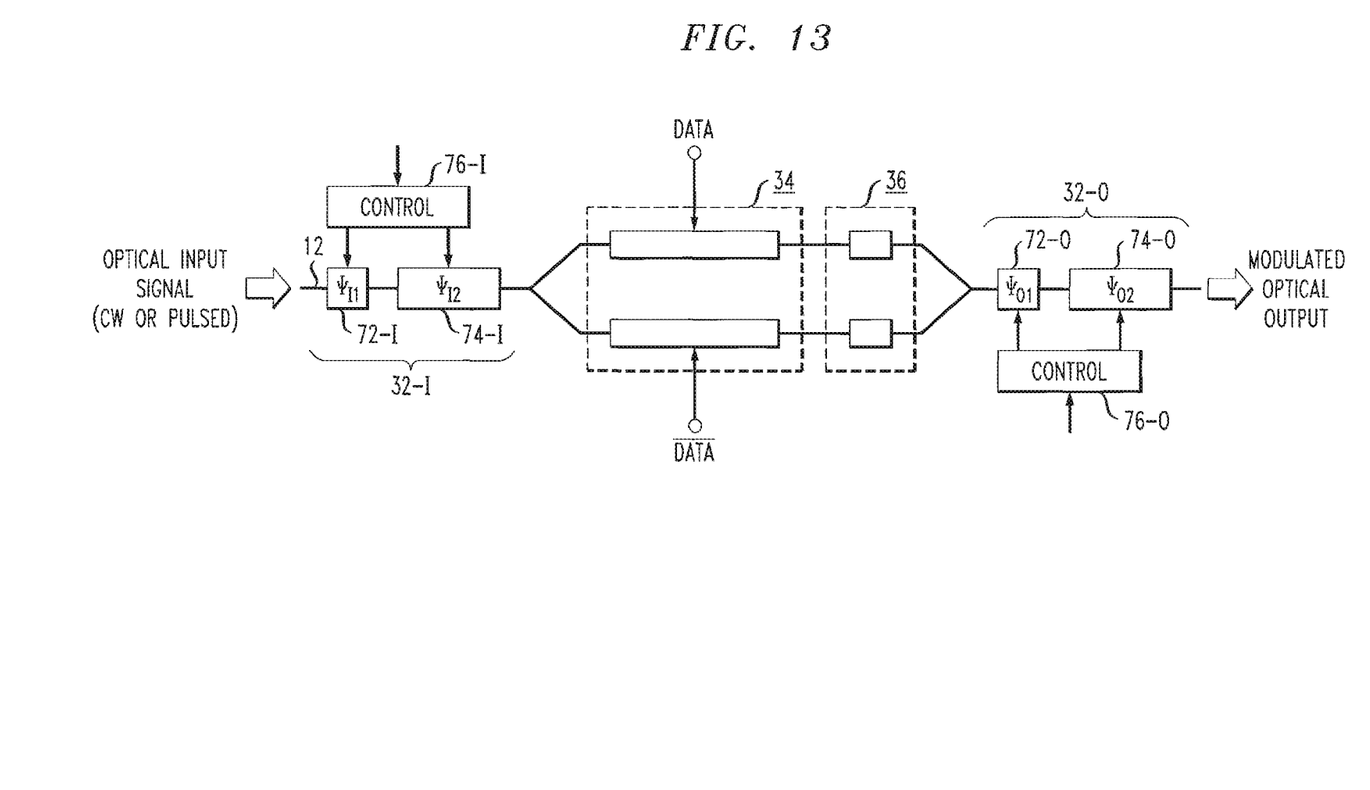
FIG. 13 illustrates another embodiment of the present invention, utilizing segmented phase control modulation sections at both (or either) of the input and output waveguiding sections.

As with the embodiment shown in FIG. 10, it is possible to utilize a segmented phase modulation control section at either the input or output of the modulator. FIG. 13 illustrates an exemplary optical modulator 70, showing in this particular embodiment both an input phase modulation control section 32-I and an output phase modulation control section 32-O (where it is to be understood that only a single segmented phase modulation control section may also be used). As with the segmented embodiment described above, input phase modulation control section 32-I is shown as comprising a pair of segments 72-I and 74-I, each of a different length and thus imparting a different phase delay $\psi_{I1}$ and $\psi_{I2}$ to the input CW optical signal. A control element 76 is shown in this particular embodiment as providing the input drive signals to input phase modulation control section 32-I, where either one or both (or neither) of the segments may be energized for a given application, thus providing a controlling amount of phase adjustment to the modulator to control the chirp exhibited by the output signal.

Similar control of segmented output phase modulation control section 32-O provides the same ability to control the amount of chirp present in the output signal by controlling the phase introduced in the output signal.

In summary, by virtue of adding one or more segments to the modulator, the phase of the input signal can be controlled to provide the desired chirp behavior for a specific application/system configuration. The relatively small size of a semiconductor modulator (as compared to prior art lithium niobate modulators) allows for the "extra" phase sections to be added to the modulator without unduly increasing the size of the overall device or otherwise impacting the performance of the modulator. Indeed, it is possible to model the semiconductor modulator as "lumped elements" and thus avoid the complicated traveling-wave electrode structure associated with prior art lithium niobate modulators.

It is further to be understood that while the specific embodiments described above are associated with a silicon-based optical modulator, the same properties of phase, chirp and the like are present in other semiconductor-based modulators (i.e., III-V based modulating devices) and the principles of incorporating one or more phase modulation control sections in these other modulator configurations will provide chirp control in the same manner. Thus, the spirit and scope of the present invention is considered to be limited only by the claims appended hereto:

What is claimed is:

1. A semiconductor-based optical modulator comprising:
an input optical waveguide responsive to an incoming continuous wave optical signal;
an input optical waveguide splitter, coupled to the input optical waveguide and configured to split the incoming continuous wave optical signal into a pair of separate signals;
a pair of optical waveguide arms, each waveguide arm coupled to a separate output from the input optical waveguide splitter, and each optical waveguide arm including a semiconductor-based modulating device comprising a first region having dopants of a first conductivity type and a second region having dopants of a second conductivity type, with an electrical modulating data signal applied to the modulating device along each optical waveguide arm to create a modulated optical signal;
an output optical waveguide combiner, coupled to the outputs of the pair of optical waveguide arms to combine the pair of separately modulated optical signals and create an optically modulated output signal thereafter coupled into an output optical waveguide; and
a phase modulation control section disposed along the optical modulator to impart a predetermined phase to the optically modulated output signal as a function of the length of the phase modulation control section, the phase modulation control section comprises a first segment disposed along a first one of the pair of optical waveguide arms and a second segment disposed along a second one of the pair of optical waveguide arms, the first and second segments driven by the same input signal to impart the predetermined phase onto the optically modulated output signal.

2. The semiconductor-based optical modulator as defined in claim 1 wherein the phase modulation control section is disposed along the pair of optical waveguide arms.

3. The semiconductor-based optical modulator as defined in claim 1 wherein the first and second segments having essentially the same length $L_{phase}$ and driven by the same input signal to impart a known phase $\psi$ onto each separately modulated optical signal.

4. The semiconductor-based optical modulator as defined in claim 3 where the first and second segments are driven by the electrical modulating data signal.

5. A semiconductor-based optical modulator as defined in claim 1 wherein the phase modulation control section is disposed along the input optical waveguide.

6. A semiconductor-based optical modulator as defined in claim 1 wherein the phase modulation control section is disposed along the output optical waveguide.

7. A semiconductor-based optical modulator as defined in claim 1 wherein the phase modulation controls section comprises a plurality of separate segments, each segment of a different length for imparting a different phase delay and controllable by a separate input signal to allow for the total phase delay imparted to the optical signal to be controlled by the individual activation/deactivation of each segment of the plurality of segments.

8. The semiconductor-based optical modulator as defined in claim 1 wherein the modulator comprises silicon.

9. A semiconductor-based optical modulator comprising:
an input optical waveguide responsive to an incoming continuous wave optical signal;

an input optical waveguide splitter, coupled to the input optical waveguide and configured to split the incoming continuous wave optical signal into a pair of separate signals;

a pair of optical waveguide arms, each waveguide arm coupled to a separate output from the input optical waveguide splitter, and each optical waveguide arm including a semiconductor-based modulating device comprising a first region having dopants of a first conductivity type and a second region having dopants of a second conductivity type, with an electrical modulating data signal applied to the modulating device along each optical waveguide arm to create a modulated optical signal;

an output optical waveguide combiner, coupled to the outputs of the pair of optical waveguide arms to combine the pair of separately modulated optical signals and create an optically modulated output signal thereafter coupled into an output optical waveguide; and a phase modulation control section disposed along the optical modulator to impart a predetermined phase to the optically modulated output signal as a function of the length of the phase modulation control section, the phase modulation control section comprises a first segment disposed along a first one of the pair of optical waveguide arms and a second segment disposed along a second one of the pair of optical waveguide arms, the first and second segments having essentially the same length and driven by the same input signal to impart the substantially same phase shift onto each separately modulated optical signal.

10. A semiconductor-based optical modulator comprising:

an input optical waveguide responsive to an incoming continuous wave optical signal;

an input optical waveguide splitter, coupled to the input optical waveguide and configured to split the incoming continuous wave optical signal into a pair of separate signals;

a pair of optical waveguide arms, each waveguide arm coupled to a separate output from the input optical waveguide splitter, and each optical waveguide arm including a semiconductor-based modulating device comprising a first region having dopants of a first conductivity type and a second region having dopants of a second conductivity type, with an electrical modulating data signal applied to the modulating device along each optical waveguide arm to create a modulated optical signal;

an output optical waveguide combiner, coupled to the outputs of the pair of optical waveguide arms to combine the pair of separately modulated optical signals and create an optically modulated output signal thereafter coupled into an output optical waveguide; and a phase modulation control section disposed along the optical modulator to impart a predetermined phase to the optically modulated output signal as a function of the length of the phase modulation control section, the phase modulation control section comprises a first segment disposed along a first one of the pair of optical waveguide arms and a second segment disposed along a second one of the pair of optical waveguide arms, the first and second segments driven by the same input signal to impart a same phase shift onto each separately modulated optical signal.

\* \* \* \* \*

UNITED STATES PATENT AND TRADEMARK OFFICE
CERTIFICATE OF CORRECTION

PATENT NO. : 8,620,115 B2
APPLICATION NO. : 13/032899
DATED : December 31, 2013
INVENTOR(S) : Webster et al.

Page 1 of 1

It is certified that error appears in the above-identified patent and that said Letters Patent is hereby corrected as shown below:

In the Specifications:

In the Background of the Invention:

Column 1, Line 29, please delete "7C" and insert -- $\pi$ -- therefor;

In the Claims:

Column 8, Claim 2, Lines 37-39, please delete "The semiconductor-based optical modulator as defined in claim 1 wherein the phase modulation control section is disposed along the pair of optical waveguide arms.";

Column 8, Claim 5, Lines 48-50, please delete "A semiconductor-based optical modulator as defined in claim 1 wherein the phase modulation control section is disposed along the input optical waveguide.";

Column 8, Claim 6, Lines 51-53, please delete "A semiconductor-based optical modulator as defined in claim 1 wherein the phase modulation control section is disposed along the output optical waveguide.".

Signed and Sealed this
Twenty-fifth Day of March, 2014

Michelle K. Lee
*Deputy Director of the United States Patent and Trademark Office*